April 14, 1970 R. K. NOLTE 3,506,022
CONVEYOR FILTER APPARATUS FOR ARTICLE WASHING APPARATUS
Original Filed July 20, 1965 5 Sheets-Sheet 4
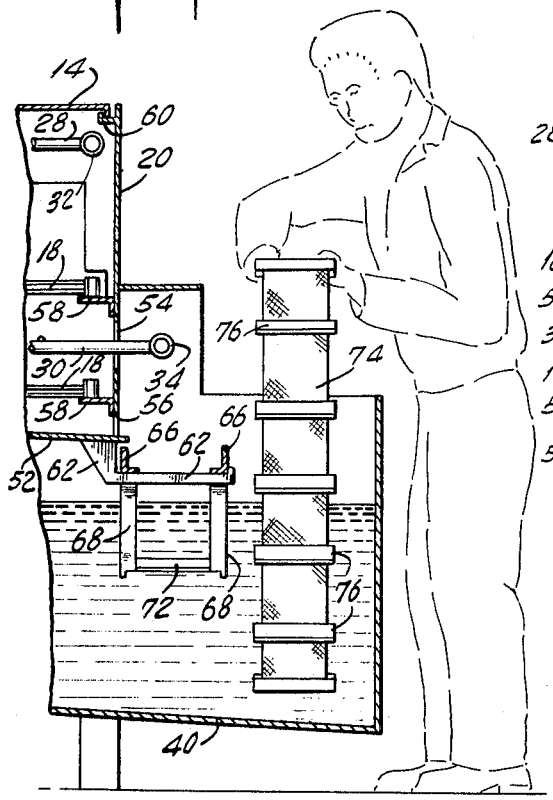
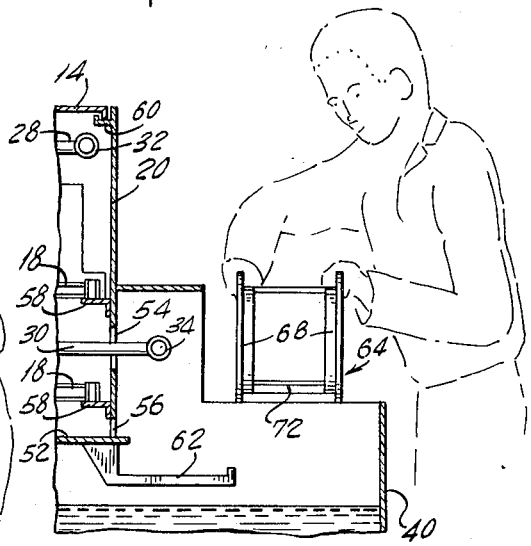
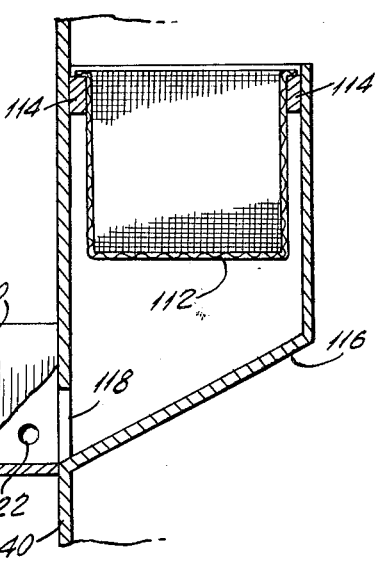
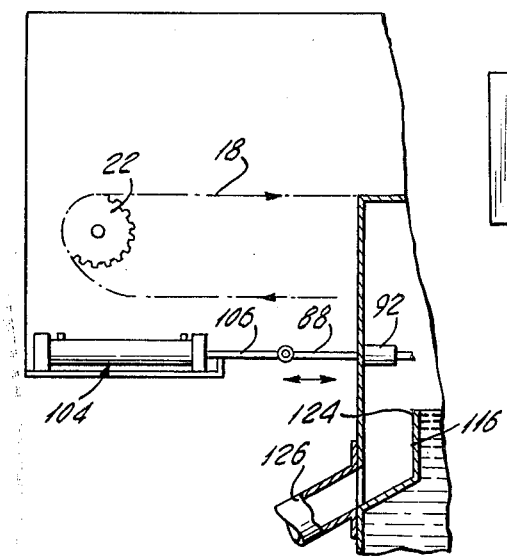
INVENTOR
ROBERT K. NOLTE
BY Nolte & Nolte
ATTORNEYS April 14, 1970 R. K. NOLTE 3,506,022
CONVEYOR FILTER APPARATUS FOR ARTICLE WASHING APPARATUS
Original Filed July 20, 1965 5 Sheets-Sheet 5

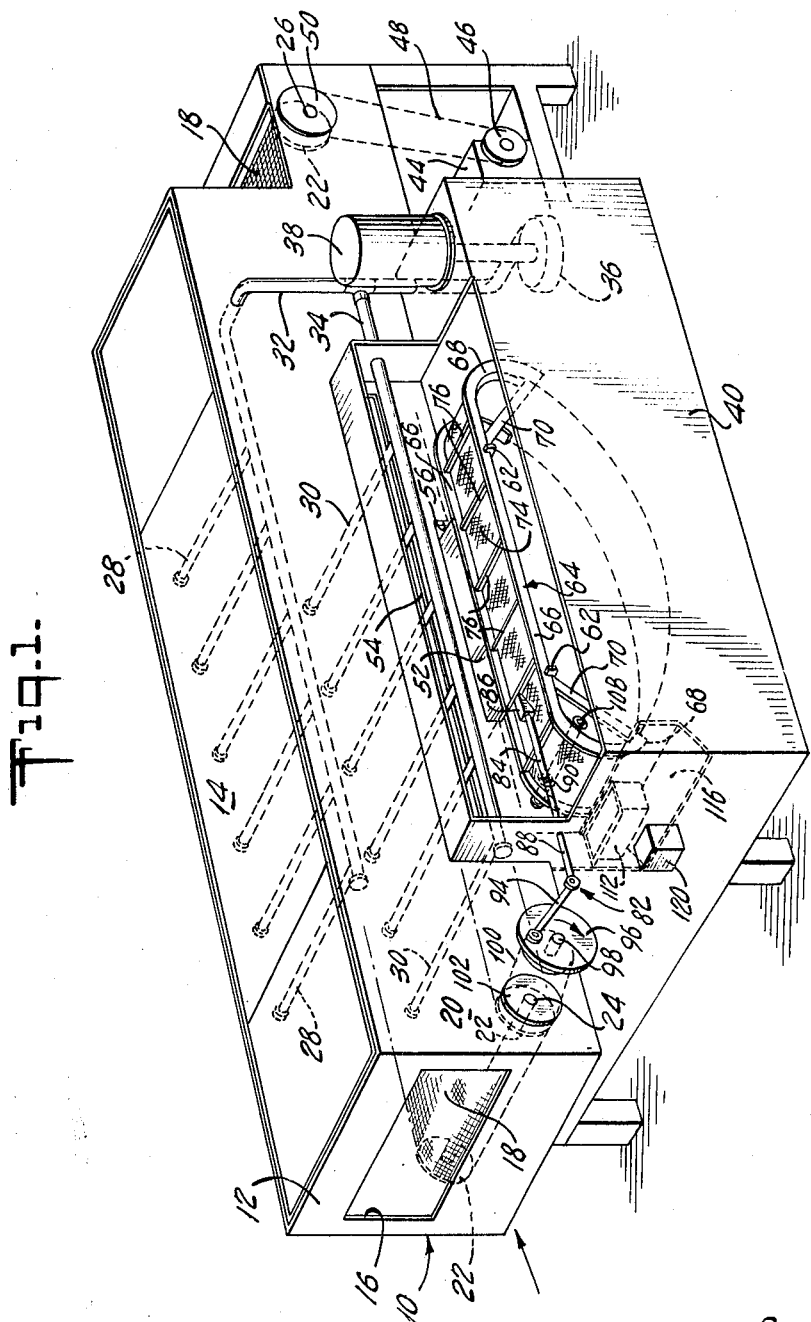

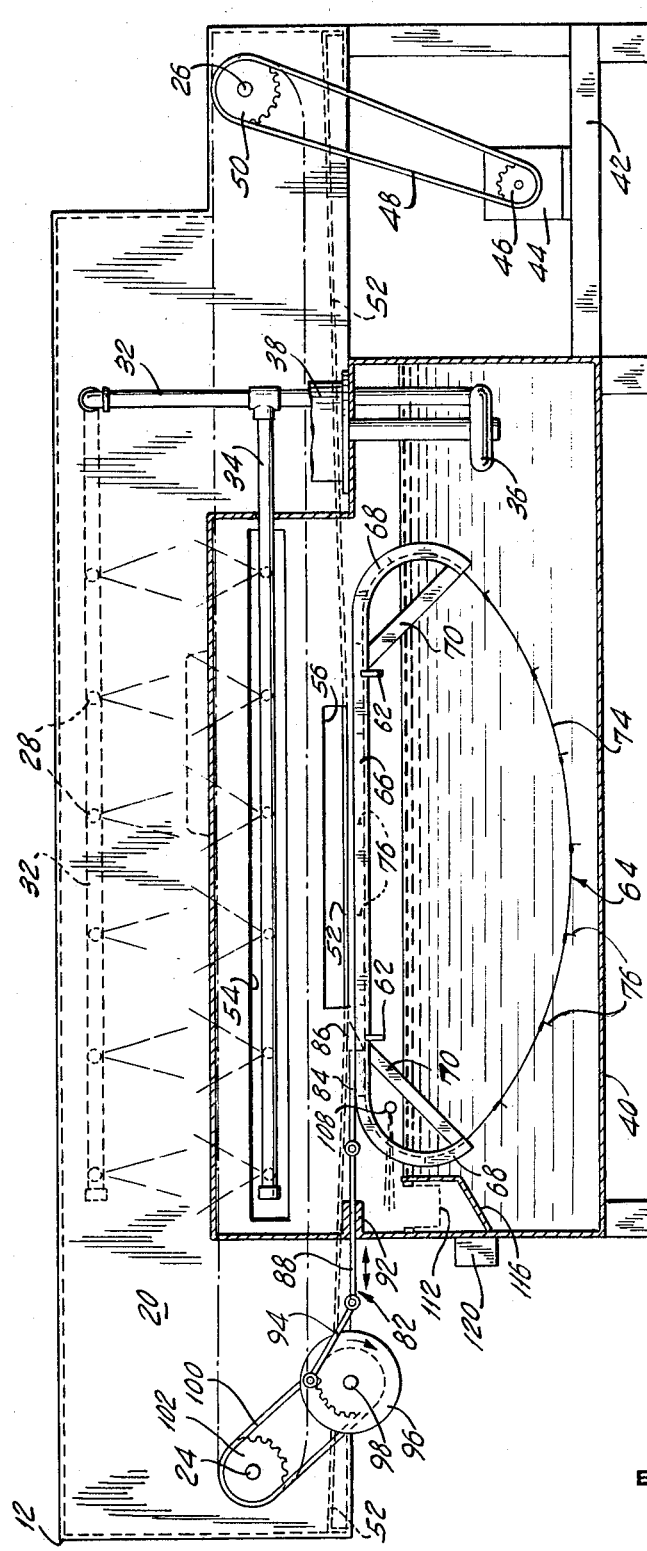

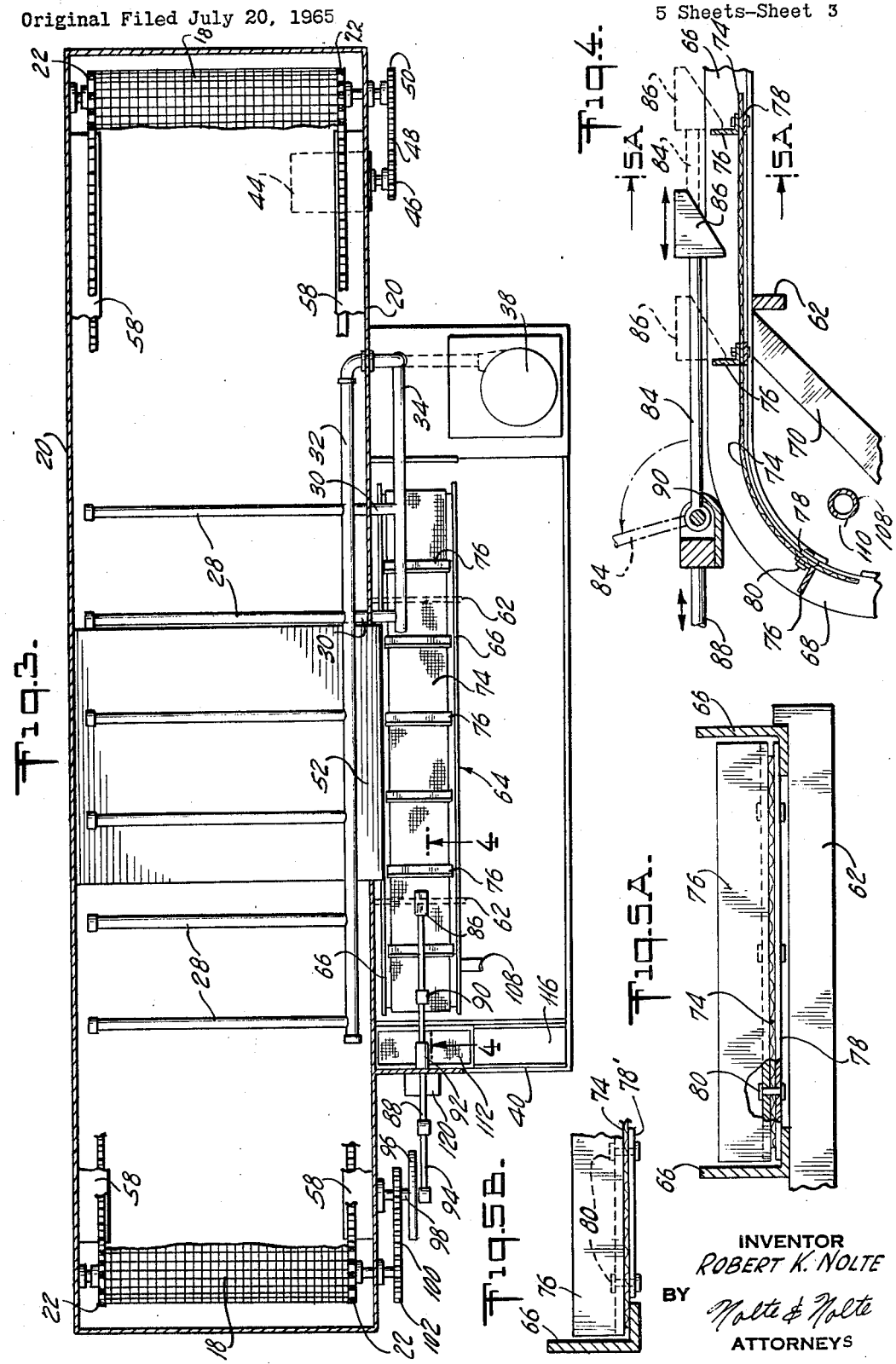

INVENTOR
ROBERT K. NOLTE
BY
Nolte & Nolte
ATTORNEYS

United States Patent Office 3,506,022
Patented Apr. 14, 1970

3,506,022
CONVEYOR FILTER APPARATUS FOR ARTICLE WASHING APPARATUS
Robert K. Nolte, Chatham, N.J., assignor to Metalwash Machinery Company, Elizabeth, N.J., a corporation of New Jersey
Continuation of application Ser. No. 609,685, Jan 16, 1967, which is a continuation of application Ser. No. 473,373, July 20, 1965. This application Feb. 19, 1968, Ser. No. 706,702
Int. Cl. B08b 3/02
U.S. Cl. 134—104      11 Claims

ABSTRACT OF THE DISCLOSURE

In apparatus for spray washing articles which includes a housing through which articles are conveyed and in which the articles are sprayed, the wash liquid being supplied by pumping the same from a tank positioned to receive the wash liquid after it has washed the articles, there is provided a filter band assembly entirely contained in the tank and removably hung on support means with the lower run of the band hanging down substantially in a catenary-like form. Means are provided to remove debris adjacent to the end of the upper run of the band and also means for receiving the removed debris to keep the water in the tank substantially free of debris. An access opening in the tank is provided so that the band and its support can be removed when desired.

---

The present invention relates to washing apparatus.

This application is a continuation of application Ser. No. 609,685 filed Jan. 16, 1967, now abandoned and which was in turn a continuation of application Ser. No. 473,373 filed July 20, 1965, now abandoned.

More particularly, the present invention relates to an apparatus which is capable of continuously washing articles as they move along a predetermined path.

Although at the present time there are known apparatus capable of continuously washing articles as they move along a predetermined path, these known apparatus are relatively wasteful of the cleaning liquids which are used to wash the articles, and in addition the speed and efficiency of the washing operations are not as great as might be desired.

One of the primary objects of the present invention is to provide an apparatus capable of continuously washing articles while at the same time capable of using washing liquid over and over again so that there will be no wasteful use of the cleaning liquid.

A further object of the present invention is to provide an apparatus which is capable of efficiently cleaning washing liquid after it has washed articles so that the liquid can be returned and recirculated for the purpose of being used repeatedly for washing articles while the articles move along a given path.

Yet another object of the present invention is to provide a filtering assembly capable of continuously filtering washing liquid after the liquid has been used to wash articles and before it is recirculated to again be used for washing articles.

Furthermore, it is an object of the present invention to provide a structure which is capable of retaining a filter assembly of the above type in a relatively clean condition so that it will be at the peak of its filtering action substantially at all times.

Also, it is an object of the present invention to provide a structure which is exceedingly compact as well as quite simple and rugged, so that a structure of the invention will not require a large amount of space and will be capable of operating reliably with a minimum amount of maintenance.

Primarily, the invention resides in draining liquid, which has been used to wash articles, to a predetermined location where there is a moving filter band means which filters the liquid before it is again recirculated back to the articles to wash them. The filter band means of the invention acts very effectively to clean the washing liquid so that the liquid which is recirculated will have an efficient cleaning action. Very importantly, the invention also contemplates the provision of a filter conveyor system, which is compatible with almost any conceivable filter conveyor use, is inexpensive enough to manufacture for widespread use in a variety of applications, is relatively care free, which can be used entirely within the reservoir tank of the recirculating spray processing machine and is capable of easy assembly and disassembly for cleaning purposes or for modifying existing machines so that they can be equipped with the conveyor system of the invention.

Within the context of this statement of the invention, applicant provides a filter band having longitudinally spaced entry and exit ends and an upper and lower run therebetween, means mounting said filter band for longitudinal movement through said upper and lower runs. Means for driving said band through said runs are provided, said upper run constitutes means for receiving liquid and debris and means are provided adjacent the exit end for removing debris collected on said upper run before the portion of said band carrying said debris passes into said lower run.

The invention is illustrated by way of example in the accompanying drawings which form part of the application and in which:

FIG. 1 is a simplified perspective illustration of one possible embodiment of an apparatus according to the invention;

FIG. 2 is a longitudinal sectional elevation of the apparatus of FIG. 1, the section of FIG. 2 being taken through a tank from which the wash liquid is recirculated back to the articles for washing the latter;

FIG. 3 is a sectional plan view of the apparatus, the section of FIG. 3 being taken at an elevation beneath the top of the entire assembly but high enough to illustrate the details of the structure of the invention;

FIG. 4 is a fragmentary sectional elevation on an enlarged scale, as compared to the preceding figures, taken along line 4—4 of FIG. 3 in the direction of the arrows and illustrating the structure of a movable filter band means of the invention;

FIG. 5A is a transverse section of the structure of FIG. 4 taken along line 5A—5A of FIG. 4 in the direction of the arrows;

FIG. 5B is a fragmentary section taken at the same location as FIG. 5A, but showing a different embodiment;

FIG. 6 is a fragmentary transverse section of the apparatus illustrating the manner in which it can be serviced by an operator;

FIG. 7 is a further fragmentary transverse section illustrating how the apparatus can be further serviced by an operator;

FIG. 8 is a fragmentary longitudinal section, on an enlarged scale as compared to the preceding figures, illustrating the manner in which fluid carrying the debris removed from the filter can be handled;

FIG. 9 is a fragmentary longitudinal section illustrating a further embodiment of a structure for handling the fluid which carries the debris away from the filter as well as a further embodiment of a driving structure for operating a reciprocating means which moves the filter band of the invention in a stepwise manner;

Figure 12:
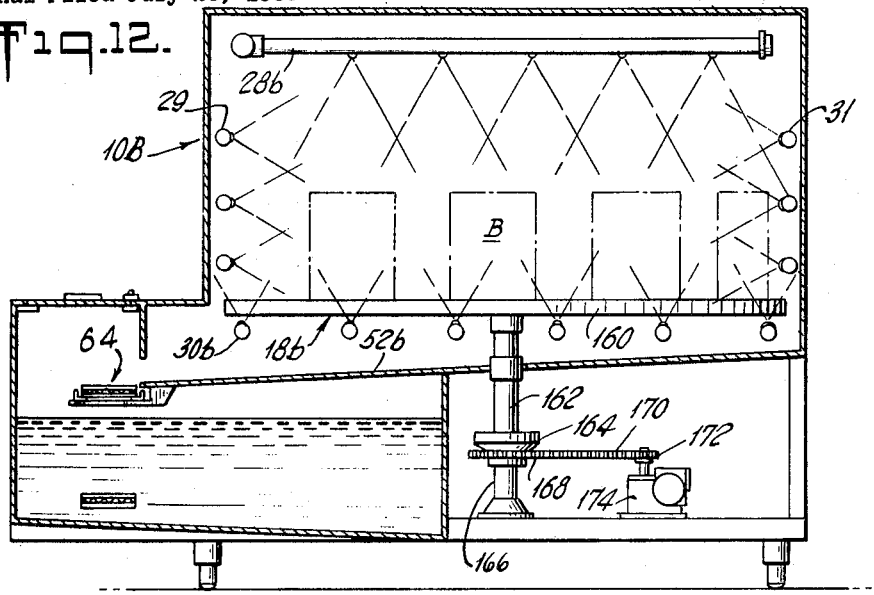
Figure 11:
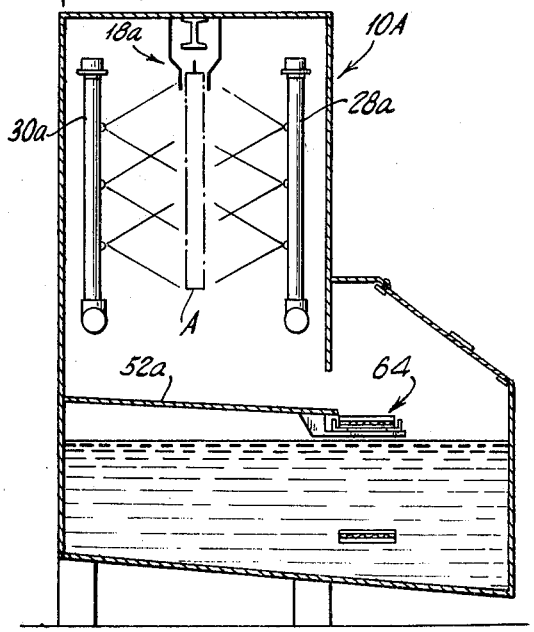
Figure 13:
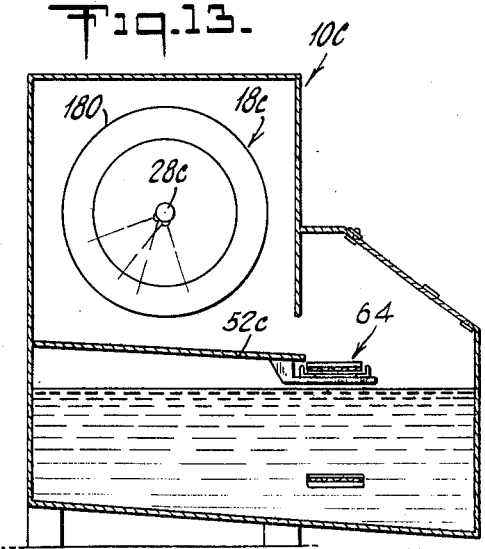

FIG. 11 schematically illustrates a further type of machine capable of using the structure of the present invention;

FIG. 12 is a schematic illustration of yet a further type of machine which may be provided with the structure of the invention; and FIG. 13 shows yet another type of machine which may receive the structure of the invention.

Referring to FIG. 1, the embodiment of the invention illustrated therein takes the form of the apparatus 10 provided with elongated hollow housing 12 in which the articles are washed. These articles may be any type of dishes, pans, pots, or the like, and the apparatus of the invention is particularly suited for baking pans. The elongated hollow housing 12 has a removable cover 14 and at one end an entrance opening 16 through which the articles to be washed are introduced. This opening 16 gives access to the article-conveying means 18 in the form of an elongated endless band of mesh construction formed from any suitable wire or plastic mesh having openings large enough to provide for practically unrestricted flow of washing liquids through the runs of the endless article-conveying means 18. The housing 12 has opposed side walls 20, and these walls 20 provide bearings for the shafts 24 and 26 which carry, for example, sprocket wheels 22 whose teeth enter into sprocket chains fixed to and forming the outer side edges of the endless article-conveying means 18.

By rotation of the sprockets the endless band 18 is advanced with its upper run moving away from the opening 16 from left to right, as viewed in FIG. 1, and the washed articles are removed from the right end of the band 18 which is freely accessible through an opening in the housing 12, as is apparent from FIG. 1.

A bank of spray pipes 28 extends transversely across the upper run of the article-conveying means 18 while a lower bank of spray pipes 30 extends between the runs of the band 18, this lower bank of pipes 30 having upwardly directed nozzles through which the washed liquid is directed upwardly through the band 18, at its upper run, while the pipes 28 have downwardly directed nozzles for directing the sprays of washing liquid downwardly. The upper bank of spray pipes 28 receive wash liquid from a header 32, while the lower bank of pipes 30 receive liquid from a header 34, and both of these headers communicate with the output of a pump 36 driven by a motor 38. The pump 36 is submerged within a filtered body of cleaning liquid situated in a tank 40 which in part extends beneath the housing 12 and in part extends laterally beyond the housing 12.

As may be seen from FIG. 2, at the end of the apparatus from which the washed articles are received there is a suitable supporting frame 42 carrying a motor 44 which drives a sprocket 46 which through a chain 48 drives a sprocket 50 fixed to the shaft 26 so as to rotate the latter and thus drive the article-conveying means 18. The shaft 26 rotates in a clockwise direction, as viewed in FIG. 2, so that the upper run of the conveyer 18 advances from the left toward the right, as viewed in FIG. 2.

Situated beneath the conveyer 18 within the housing 12 is a drain plate 52 which is large enough to extend completely beneath and somewhat beyond the entire conveyer 18 up to the side walls and end walls of the housing 12. This drain plate 52 is inclined downwardly from the ends of the housing 12 toward the center thereof, as is apparent from FIG. 2, and in addition the drain plate is inclined transversely, as is apparent from FIG. 6. Thus, the right wall 20 of the housing 12, as viewed in FIG. 6, this being the wall 20 which is visible in FIGS. 1 and 2, is formed not only with an opening 54 through which these spray pipes 30 extend from the header 34, but in addition this side wall 20 is formed with an opening 56 which has the elongated rectangular configuration most clearly shown in FIG. 2 and through which an edge portion of the drain plate 52 extends. This drain plate is laterally inclined downwardly toward the opening 56, so that, as viewed in FIG. 6, the right edge of the drain plate 52 is lower than its left edge which is not visible in FIG. 6. As a result all of the wash liquid will be received by the drain plate 52 and will be directed out of the housing 12 through the opening 56.

FIG. 6 also shows the angle members 58 which extend along the side walls of the housing 12 at the interior thereof for guiding the side edges of the endless conveyor band 18. Also FIG. 6 shows one of a pair of upper elongated angle members 60 carried by the side wall 20 visible in FIG. 6 and serving to support one edge of the removable cover 14 whose opposite edge is supported in precisely the same way as the other wall 20 of the housing 12.

As may be seen from FIG. 6, a cantilever type of support member 62 is fixed to the underside of the drain plate 52 and extends laterally therefrom to the portion of the tank 40 which is accessible beyond the housing 12. This portion of the tank 40 has an open top so that the operator can have access to the interior of the tank 40 at its portion which extends laterally beyond the housing in the manner indicated in FIG. 6. A pair of these cantilever type of support members 62 form a support means for a track assembly 64, and the distance between the pair of members 62 of the support means is apparent from FIG. 2, as well as FIG. 1. At their free ends the support members 62 have upwardly directed projections which serve to retain the track assembly 64 on the support members.

The track assembly 64 is formed by a pair of elongated track member 66 in the form of angle irons having in cross section the configuration most clearly apparent from FIGS. 5 and 6. These elongated track members 66 simply rest on the support means 62, and they are provided with curved ends 68 the configuration of which is most clearly apparent from FIG. 2. Struts 70 are provided to reinforce the curved ends 68 of the track 64, and it will be noted that the upper ends of the struts 70, as viewed in FIG. 2, are situated closely adjacent to the pair of support members 62, so that by simply resting the angle members 66 of the track assembly 64 on the members 62, the struts 70 cooperate with these members 62 to avoid any substantial longitudinal shifting of the track assembly 64. In addition, as is shown in FIG. 6, transversely extending reinforcing members 72 are situated at the free ends of the track assembly 64.

This track assembly 64 serves to support and guide a filter band means of the invention which includes the endless, flexible, foraminous filter band 74 made of any suitable wire or plastic mesh, for example. It is preferred, however, to make the mesh band of stainless steel and the tracks 66 of a softer material, such as brass. The width of the endless band 74 of course corresponds to the distance between the track members 66, and, as is apparent from FIG. 2, in particular, the endless filter band 74 is not only guided along the track elements 66 and around the curved ends 68 thereof, but in addition the length of the endless filter band 74 is such that it hangs loosely down from the track assembly in the manner shown most clearly in FIG. 2.

In order to move the filter band 74 along the track assembly 64, the band 74 fixedly carries at regular intervals therealong cleats 76 which extend at least part of the way transversely across the band 74. In the illustrated example these cleats extend all the way across the band, and they are fixed thereto either in the manner shown in FIG. 5A or as shown in FIG. 5B. Thus, each cleat 76 is in the form of an elongated angle member which can move freely between the track members 66, and each angle member 76 has a wall directly engaging the outer surface of the endless band 74 and a second wall projecting from the band 74. The band-engaging wall of each cleat 76 is situated directly over a transverse backing plate or bar 78 situated at the side of the band 74 opposite from the cleat 76, and suitable rivets 80 serve to fix the cleats 76 respectively to the bars 78, so that in this way the band 74 is clamped between the elements 76 and 78 and is not stressed by any connection of the cleats 76 directly to the band itself. In addition, it will be noted from FIG. 5A that with this construction it is the free ends of the transverse bars 78 which directly engage and slide along the angle members 66 of the track assembly 64, and since these free ends of the bars 78 are quite smooth, the frictional resistance to movement of the band is quite low. However, in order to avoid any gaps between band 74 and the inner webs of angle members 66, shorter bars 78' may be used, as shown in FIG. 5B, having a length smaller than the distance between tracks 66, so that the band 74 directly engages the latter.

A reciprocating means 82 (FIG. 2) cooperates with the successive cleats 76 for advancing the band 74 in a stepwise manner. This reciprocating means 82 includes, as shown most clearly in FIG. 4, an elongated rod 84 which forms part of a pawl assembly which includes the tooth member 86 situated at the free end of the rod 84.

This tooth 86 has an inclined lower surface, as viewed in FIG. 4, enabling the tooth 86 to ride over a cleat, as is apparent from FIG. 4, and then the left end face of the tooth 86 engages the right surface of the cleat, as viewed in FIG. 4, so that when the rod 84 is shifted to the left, as viewed in FIG. 4, the band 74 will, at its upper run, also be shifted to the left, while when the rod 84 is shifted to the right the band will remain stationary while the tooth 86 rides over the next cleat.

The rod 84 is pivotally connected to the free end of a second rod 88 which carries a limiting member 90 which limits clockwise pivotal movement of the rod 84 to the solid line position shown in FIG. 4. Therefore, the rod 84 cannot move downwardly beyond the horizontal elevation thereof shown in FIG. 4, although this rod 84 can be tilted up to the dot-dash line position indicated in FIG. 4 for a purpose referred to below.

As may be seen from FIG. 2, the rod 88 is guided for longitudinal movement through a sleeve 92 fixedly carried by a wall of the tank 40, and this rod 88 is pivotally connected at its left end, as viewed in FIG. 2, to a connecting rod 94 which is in turn pivotally connected to a rotary disc 96 which is fixed to the rotary shaft 98 which is carried for rotation by a suitable bearing mounted on the side wall 20 which is visible in FIG. 1. Because the conencting rod 94 is pivotally connected to the disc 96 at a location spaced from the shaft 98, which is fixed to the central portion of the crank disc 96, the radius between the shaft 98 and the pivotal connection of the connecting rod 94 to the disc 96 forms a crank arm driving the connecting rod 94 and reciprocating the rod 88 back and forth so as to produce the stepwise movement of the band 74 in the manner described above. The shaft 98 fixedly carries a sprocket driven by an endless sprocket chain 100 which is in turn rotated by a sprocket wheel 102 fixed to the shaft 24 at a part thereof which extends outwardly beyond the housing 12. Therefore, it will be seen that the upper run of the article-conveying means 18 serves not only to support articles while they are washed but in addition it transmits the drive from the shaft 26 to the shaft 24 so that the article-conveying means also acts as part of a transmission to the reciprocating means 82 for actuating the latter to drive the endless filter band 74.

It is not essential, however, to drive the filter band from the conveyer 18, and FIG. 9 shows an arrangement where a motor 104 reciprocates a rod 106, connected to and reciprocating the rod 88 so as to advance the band 74, in a stepwise manner. This motor 104 may be a hydraulic motor in which a piston is reciprocated back and forth in a well known manner, or the motor 104 may be a pneumatic motor in which the piston is reciprocated back and forth by alternately applying air pressure automatically to the opposed faces of the piston, as is well known in pneumatic motors of this type.

Because of the construction of the track assembly and the length of the endless band 74 with respect to the track assembly 64 the operator can at any time lift the band off the track without in any way disturbing the track itself, as is indicated in FIG. 6, and for this purpose the operator need only swing the rod 84 up to the dot-dash line position indicated in FIG. 4, so as to facilitate removal of the endless band. In this way from time to time, as required, the endless band may either be replaced or may be manually cleaned when the machine is not operating. Also, whenever any repairs of the fastening of the cleats to the band is required the manipulations illustrated in FIG. 6 render such repairs extremely convenient to carry out.

At relatively longer intervals there may collect on the tracks 66 themselves sufficient debris to warrant cleaning of these tracks, and it will be noted from FIG. 7 that after the band 74 has been removed the track assembly itself can simply be lifted away from the support means 62 without in any way disturbing the latter, so that the track assembly 64 also is very easy to clean, and, once cleaned, can simply be replaced on the cantilever-type of support members 62 so that the band can then be replaced and the operations resumed. Also, removal of the track assembly 64 gives easy access to the interior of the tank for servicing purposes.

During operation of the apparatus of the invention debris washed from the articles conveyed through the apparatus will collect on the filter band, and in accordance with a further feature of the invention this debris is continuously removed from the filter band so that the band is maintained at all times at substantially its peak performing capability. For this purpose a band cleaning means in the form of a pipe 108 is provided, this pipe 108 extending between the runs of the endless band 74 and being situated in the illustrated example adjacent the left end of the band, as viewed in FIG. 2. As may be seen from FIG. 4, the pipe 108 is provided with a plurality of spray nozzles 110, and this pipe 108 is closed at its free end but at its other end communicates with a suitable source of fluid under pressure such as a suitable cleaning liquid or even air without any liquid, although a fluid such as steam would also be suitable. The spray nozzles 110 are distributed all the way across the width of the band 74 so that the band cleaning fluid will spray through the band 74 toward the left end wall of the tank 40, as viewed in FIG. 2. In this way the band is continuously cleaned as it is advanced in a stepwise manner by the reciprocating means 82 and before the debris deposited on the upper run has an opportunity to be carried along the lower run and into the washing liquid in the tank.

Of course, the debris removed from the band 74 should be kept to the greatest possible extent, out of the liquid which is recirculated by the pump 36, and for this purpose the left end wall of the tank 40, as viewed in FIG. 2, carries a structure for catching the debris and maintaining it separate from the liquid which is recirculated by the pump 36. As may be seen from FIG. 8, this catch means may take the form of a foraminous basket 112 which has at its upper end an outwardly directing lip resting on support members 114 carried at the interior of a compartment 116 which is carried by the tank 40 at the interior of its end wall. This compartment communicates through an opening 118 with another compartment 120 situated at the exterior of the tank 40 and communicating through a pipe 122 with a suitable waste receiver such as a sewer. From time to time the basket 112 is removed so as to be cleaned, and it will be noted from FIG. 3 that even though the basket is situated directly beneath the sleeve 92, nevertheless this basket can be moved longitudinally and removed from the tank because the compartment 116 is sufficiently longer than the basket 112 to permit such removal and replacing of the basket 112.

Compartment 116 also acts as an overflow trough to limit the height of the surface of the liquid.

The catch means formed by the basket 112 is not essential, however, and instead an arrangement as shown in FIG. 9 where a compartment 124 simply communicates directly with a waste pipe 126 will also suffice, this compartment 124 having an upper open end situated in the path of fluid flow from the pipe 108 so that this fluid which carries the debris will deposit the debris directly in the compartment 124 to flow out of the latter into the waste pipe 126 and to the sewer or the like, for example.

It is apparent from the above description that while the structure of the invention is quite simple nevertheless it will continuously provide clean washing liquid for washing the articles which are conveyed by the band 18 through the apparatus. If part of the removed debris falls into the washing liquid, this small amount of debris will be recirculated through the apparatus with the washing liquid so as to be redeposited on the foraminous band, and in this way the cleaning liquid is also maintained clean. In this connection it is to be noted that by situating the pipe 108 at that end of the band 74 which has just received the liquid from the drain plate 52, not only is the debris removed before having access to the cleaning liquid, which is collected in the tank 40 to be pumped by the pump 36, but in addition if there are any stubborn particles of debris which are not completely removed by the fluid spray from the pipe 108, these particles will be removed during passage of the lower run of the band through the cleaning liquid itself, so that such particles will again be recirculated through the apparatus to be received by the band and eventually removed therefrom by the fluid sprayed from the cleaning pipe 108.

Any grease remaining on the band will dissolve in the detergent in the tank.

Figure 10:
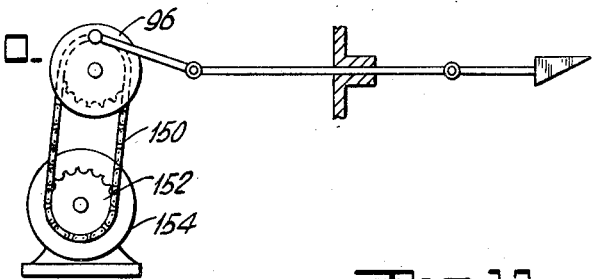
FIG. 10 shows another embodiment of a driving structure for the filter band.

As may be seen from FIG. 10, instead of taking the drive for the reciprocating means from the conveyor itself, a separate source of power may be connected to the reciprocating means. Thus, as indicated in FIG. 10, the rotary crank or arm disc 96 may have the sprocket wheel which is co-axially fixed thereto driven from a chain 150 which is in turn driven from a sprocket wheel 152 rotated by a separate motor 154.

Moreover, the structure of the present invention need not necessarily be used with that type of machine where the articles which are washed are supported on the upper run of a horizontal conveyor band. Instead, various other types of machines such as illustrated in FIGS. 11–13, may be used with the invention.

In FIG. 11, the machine 10A includes a conveyor 18a which is situated in a horizontal plane with its runs located at the same elevation and one run of the endless conveyor 18a extends through the machine while the other run extends along the outside of the machine and is not illustrated. The articles A which are to be washed are simply suspended from the article conveyor means 18a which secures the articles A between the banks of spray pipes 28a and 30a which extend vertically in the manner indicated in FIG. 11. Of course, in this case also the liquid will fall onto a drainage plate 52a which directs the liquid to the filter band and the remaining structure precisely as described above.

In the embodiment shown in FIG. 12, the articles B which are to be washed are supported by a conveyor means 18b which includes a rotary table 160 carried by a rotary shaft 162, fixed at its bottom end to a sleeve 164 which is turnable on a pedestal 166, but cannot move axially with respect thereto. The rotary sleeve 164 fixedly carries a sprocket 168 driven by a chain 170 which extends around the sprocket 168 and a second sprocket 172 driven by the source of power 174. Thus, with the machine 10B of FIG. 12, the articles B are simply placed on the rotary table 160 which is suitably apertured so that the washing liquid can be directed against the articles B from beneath by the lower bank of spray pipes 30b diagrammatically indicated in FIG. 12. The machine 10B also has an upper bank of spray pipes 28b as well as vertically arranged banks of pipes 31. In this case also the washing liquid drops onto the drainage plate 52b which drops the washing liquid to the structure of the present invention, which indicates that FIG. 12 can be also precisely as described above.

In FIG. 13 the machine 10C has article conveying means 18c in the front of a rotary perforated drum 180 which receives the articles C in its interior and which surrounds a spray pipe 28c from which the washing liquid is directed onto the articles in the rotary drum 180 as diagrammatically illustrated in FIG. 13. The washing liquid in this case also is received by the drainage plate 52c which directs it to the structure of the invention which in the case of FIG. 13 also can have precisely the same structure as that described above.

The guiding of the endless band 74 on the stationary tracks 66, according to the invention, eliminates the necessity of providing guide rollers, shafts, bearings, etc. for the band.

While specific embodiments of the present invention have been described, it is apparent that other modifications will occur to those skilled in the art, and it is to be understood that the specific embodiments are not presented by way of limitation but that the present invention comprehends all constructions coming within the scope of the appended claims.

What I claim is:

1. Improved apparatus for spray washing articles comprising, in combination:
   (a) a housing having means permitting the insertion and removal of the articles to be washed and means to drain wash liquid therefrom;
   (b) article support means positioned within said housing;
   (c) spray means positioned for directing a wash liquid against the articles on said support means;
   (d) pump means to recirculate the wash liquid back to said spray means;
   (e) a tank positioned to receive the liquid drained from the housing, said tank being in liquid communication with said pump means and arranged to hold the supply of the liquid to be sprayed, said tank having an opening permitting access to the interior thereof;
   (f) an endless, foraminous, filter band assembly entirely contained in said tank and comprising support means for supporting an upper, substantially horizontal filtering run, a lower run and end portions connecting said upper and lower runs, said filtering run being positioned in said tank below the housing drain means whereby the sprayed liquid may flow downwardly through the filtering run leaving debris thereon;
   (g) means to advance said band;
   (h) means for removing debris from said band comprising means for directing a fluid through said filter band at the end portion thereof adjacent the exit end of the filtering run, the fluid being directed in a plane substantially parallel to the plane of the filtering run of said band;
   (i) means adjacent said fluid directing means to receive the debris, whereby the liquid in said tank is maintained substantially free of said debris;
   (j) and band support means to loosely and removably hang said band in said tank whereby said entire band may be removed from said support means by merely lifting said band therefrom and then from said tank through the access opening therein.

2. The apparatus in accordance with claim 1 including means mounted in said tank for supporting said band support means for ready removal thereof whereby both said band and said support means may be removed from the tank through the access opening thereof.

3. Improved apparatus for spray washing articles comprising, in combination:
(a) a housing having means permitting the insertion and removal of the articles to be washed and means to drain wash liquid therefrom;
(b) article support means positioned within said housing;
(c) spray means positioned for directing a wash liquid against the articles on said support means;
(d) pump means to recirculate the wash liquid back to said spray means;
(e) a tank positioned to receive the liquid drained from the housing, said tank being in liquid communication with said pump means and arranged to hold a supply of the liquid to be sprayed, said tank having an opening permitting access to the interior thereof;
(f) an endless, foraminous filter band entirely contained in said tank and comprising an upper, substantially linear filtering run, a lower run and end runs connecting said upper and lower runs, said filtering run being positioned in said tank below the housing drain means whereby the sprayed liquid may flow downwardly through the filtering run leaving debris thereon, the lower run being positioned below the liquid level of said tank and hanging down in substantially a catenary-like form;
(g) means to advance the band;
(h) means for removing debris from said band comprising means for directing fluid through said filter band thereof adjacent the exit end of the filtering run;
(i) means adjacent said exit end of the filtering run to receive the debris, whereby the debris is kept from entering the liquid in the tank; and
(j) band support means to loosely and removably hang said band in said tank whereby said entire band may be removed from said support means by merely lifting said band therefrom and then from said tank through the access opening therein.

4. Filtering apparatus for use with a washing machine having article support means, spraying means arranged to direct a liquid against the articles on the support means, a housing at least partially enclosing the article support and spraying means, the housing having access means permitting the insertion and removal of the articles, means to drain the sprayed liquid from the housing, a tank positioned to receive the liquid drained from the housing and arranged to hold a supply of the liquid to be sprayed the tank having an opening permitting access to the interior thereof, and pump means communicating with the interior of the tank to recirculate the liquid from the tank to the spraying means, said filtering apparatus comprising:
(a) an endless, foraminous band defined by an upper, substantially linear, filtering run adapted for horizontal positioning in the tank below the housing drain means whereby the sprayed liquid may flow downwardly through the filtering run leaving debris thereon, a lower run for extending below the liquid level for immersion in the liquid in the tank and spaced apart end portions connecting said upper and lower runs;
(b) band support means to loosely and removably hang said band in the tank whereby said entire band may be removed from said band support means by merely lifting said band therefrom and then from the tank through the access opening therein;
(c) said band hanging loosely downwardly from said band support means and having a length great enough to permit an operator to lift said band away from said support means and to replace it on said support means without changing said support means in any way means for advancing said band through said runs and debris removing means comprising means for directing a fluid through said filter band at the exit end of the filtering run, the fluid being directed in a plane approximately parallel to the plane of the upper run of said band; said debris removing means is a jet to direct the fluid against the inside surface of said band; and means adjacent said fluid directing means to receive the debris whereby the liquid in said tank is maintained substantially free of such debris.

5. The apparatus in accordance with claim 4 wherein said band support means comprises bracket means for mounting in the tank and stationary track means, said bracket means constituting means for freely and loosely seating said track means thereon, said track means constituting means for guiding said band during movement thereof, said track means being removable from the tank by merely lifting the same from said bracket means and through the access opening in the tank.

6. The apparatus in accordance with claim 4, wherein said band support means includes track means having laterally spaced apart, elongated members to slidably guide the side edges of said band, each said member having a longitudinal, substantially horizontal portion terminating in spaced apart, downwardly curving end portions, said longitudinal portion of said members being positioned to have said upper run of said band seated thereon, said curved end portions of each said member being arranged to have said end portions of said band positioned thereagainst.

7. The apparatus in accordance with claim 4, including intermittent drive means comprising pawl means, means pivotally coupled thereto to reciprocate said pawl means and ratchet means secured to said band in cooperative relationship with said pawl means.

8. The apparatus in accordance with claim 7, wherein said band is a plastic member and said ratchet means extends at least partially across the width thereof, said ratchet means being spaced along the length of said band and formed of a material that is relatively stiff compared to said band to thereby stiffen said band.

9. The apparatus in accordance with claim 7, wherein said ratchet means comprises a plurality of angle pieces spaced along the length of said band, a first leg of each said angle piece being secured to the outer surface of said band transversely thereof, the ends of said first leg being substantially coterminus with the longitudinal side edges of said band, the second leg of each said angle piece extending in a direction away from said band surface.

10. The apparatus in accordance with claim 9, wherein there is further included plate means secured to and substantially parallel with each said first leg whereby said band is clamped therebetween, the transverse dimension of said plate means being less than the width dimension of said band.

11. Apparatus for continuously washing articles comprising elongated article-conveying means for conveying articles which are to be washed along a substantially horizontal path, liquid directing means located along said path for directing washing liquid against the articles conveyed by said article-conveying means so as to wash the articles as they move along said path, elongated drain plate means located beneath said path and extending in the same general direction as said path, said drain plate means being laterally inclined and having one side edge which is lower than the other so that the liquid falling from the articles is directed by said drain plate means to said lower side edge thereof, elongated movable filter band means comprising an endless, flexible, foraminous band and a stationary track assembly guiding said band for stepwise movement, said filter band means being located adjacent and just beneath said lower side edge of said drain plate means for receiving liquid therefrom and for filtering the liquid as it falls downwardly through at least a portion of said filter band means, said filter band hanging loosely downwardly from said track assembly and having a length great enough to permit an operator to lift said band away from said track assembly and to replace it on said track assembly without changing said track assembly in any way, a support means extending beneath a portion of said track assembly whereby said track assembly rests on said support means so that the track also can at any time be raised away from said support means and be replaced thereon without in any way changing said support means, tank means communicating with the underside of said portion of said filter band means for receiving filtered liquid therefrom and circulating means communicating with said tank means and with said liquid-directing means for circulating liquid from said tank means back to said liquid-directing means to be again directed by the latter to articles conveyed by said article conveying means along said path, said filter band means includes an upper, substantially horizontal, filtering run, a lower run and end portions connecting said upper and lower runs, and wherein debris removing means comprising means for directing a fluid through said filter band means are provided at the end portion thereof adjacent the exit end of said filtering run, the fluid being directed in a plane approximately parallel to the plane of the upper run of said filter band means, intermittent drive means comprising pawl means, means pivotally coupled thereto reciprocate said pawl means and ratchet means secured to said filter band means in cooperative relationship with said pawl means.

References Cited

UNITED STATES PATENTS

| | | | |
|---|---|---|---|
| 2,097,529 | 11/1937 | Nordell | 210—401 X |
| 2,456,040 | 12/1948 | Alling et al. | 134—131 X |
| 2,602,186 | 7/1952 | Johnson | 134—104 X |
| 3,012,677 | 12/1961 | Hungate | 210—400 X |
| 2,097,529 | 11/1937 | Nordell | 210—401 X |
| 2,175,677 | 10/1939 | Zademach | 134—72 |
| 2,456,040 | 12/1948 | Alling et al. | 134—131 X |
| 2,602,186 | 7/1952 | Johnson | 134—104 X |
| 3,012,677 | 12/1961 | Hungate | 210—400 X |
| 3,225,928 | 12/1965 | Black | 210—400 X |
| 1,130,015 | 3/1915 | Paul | 134—72 |
| 1,513,628 | 10/1924 | Risser | 134—131 X |
| 2,175,677 | 10/1939 | Zademach | 134—72 |
| 2,314,048 | 3/1943 | Ladewig | 134—104 |
| 2,573,169 | 10/1951 | Gerlach et al. | 134—72 X |

SAMIH N. ZAHARNA, Primary Examiner

U.S. Cl. X.R.

210—167, 249, 391; 134—131